Oct. 30, 1923.
S. O. HULETT
1,472,758
DIFFERENTIAL
Filed Oct. 11, 1921
3 Sheets-Sheet 1
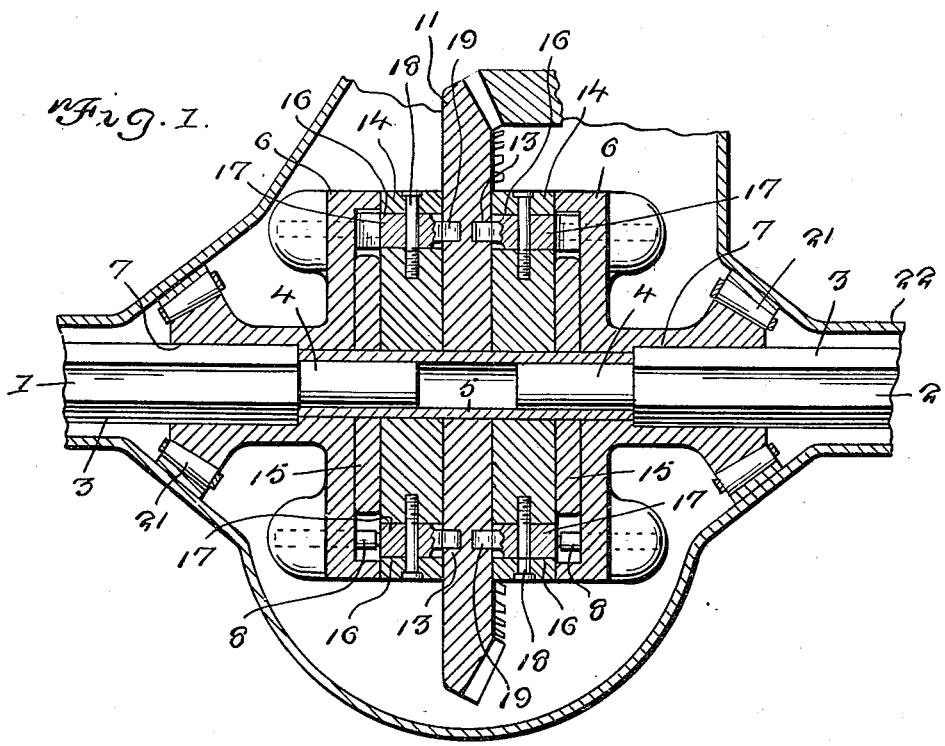
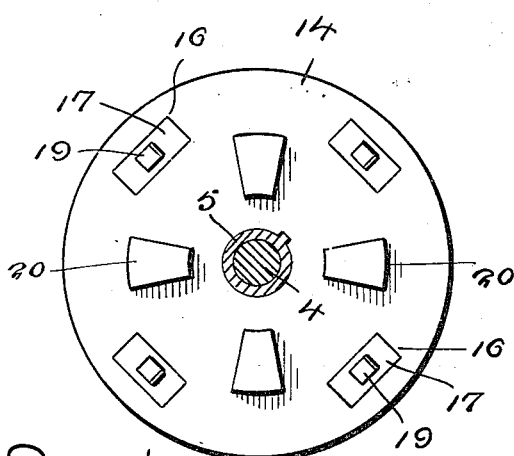
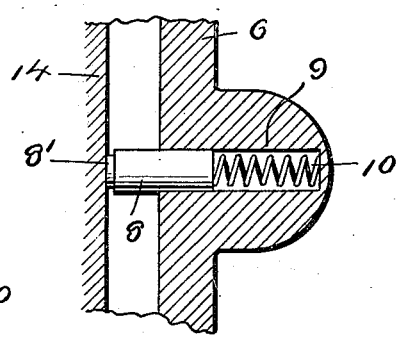

Oct. 30, 1923.

S. O. HULETT 1,472,758

DIFFERENTIAL

Filed Oct. 11, 1921

S. O. HULETT 1,472,758

DIFFERENTIAL

Filed Oct. 11, 1921

S. O. Hulett
INVENTOR

BY Victor J. Evans
ATTORNEY

WITNESS:
E. R. Ruppert
L. B. Middleton

Patented Oct. 30, 1923.

1,472,758

UNITED STATES PATENT OFFICE.

SNOE O. HULETT, OF CORRY, PENNSYLVANIA.

DIFFERENTIAL.

Application filed October 11, 1921. Serial No. 506,966.

*To all whom it may concern:*

Be it known that I, SNOE O. HULETT, a citizen of the United States, residing at Corry, in the county of Erie and State of Pennsylvania, have invented new and useful Improvements in Differentials, of which the following is a specification.

This invention relates to an improvement in the differential drive for motor vehicles, the principal object of the invention being to provide a gearless, positive and equal drive on both wheels at all times, except when one wheel is traveling faster than the opposite wheel, as in going over a knoll or a curve.

Another object of the invention is to locate the differential means upon a short shaft which is arranged between the driven shafts and to substitute dogs and pins in place of gears.

Another object of the invention is to provide means for operating the dogs from the master wheel by giving said wheel a limited movement upon its shaft.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a longitudinal sectional view through a differential constructed in accordance with my invention.

Figure 4 is an inner face view of one of the dog carrying wheels.

Figures 7 and 8 are detail views.

Figure 2:
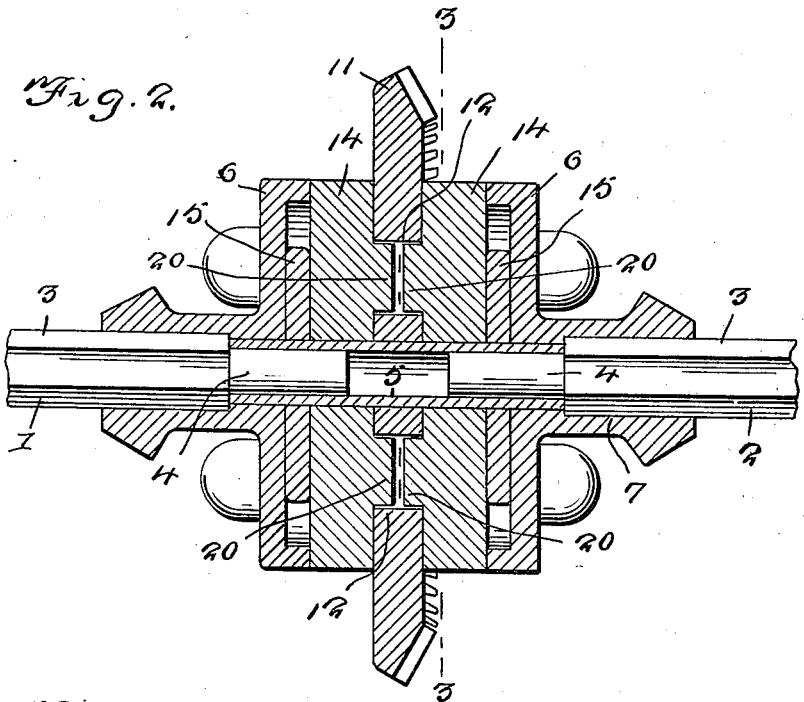
Figure 2 is a section taken on a plane at right angles to Figure 1.
Figure 3:
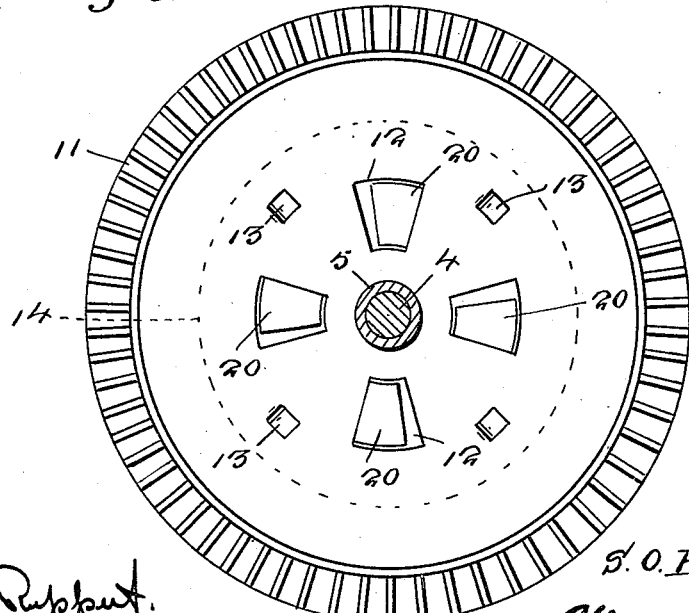
Figure 3 is a view of the master wheel taken substantially on line 3—3 of Figure 2.

In these views 1 and 2 indicate the shafts to which the rear wheels of the vehicle are connected. These shafts have their inner portions of rectangular or octagon shape in cross section, as shown at 3, with their extremities reduced, as shown at 4, and a short hollow shaft 5 is placed between the inner ends of said shafts with its ends receiving the reduced extremities 4 of said shafts. A pin carrying wheel 6 is secured to the inner end of each of said shafts 1 and 2 by having a socket 7 therein formed to receive the part 3 so that said wheel will turn with the shaft. Pins 8 fit in holes 9 formed in the wheel and springs 10 tend to force the pins out of the holes. A master gear wheel 11 is rotatably mounted on shaft 5 at the center thereof and this wheel 11 is geared to the jack shaft in the usual or any desired manner. This wheel is provided with openings 12 and notches 13 in each face. Dog or pawl carrying wheels 14 are keyed to shaft 5 and are located between the wheel 11 and the pin carrying wheels 6, washers 15, of small diameter being located between the wheels 6 and 14. Recesses 16 are formed in the wheels 14 to receive dogs or pawls 17. These dogs or pawls are pivotally supported in the recesses by pins 18 so that they can have rocking movement and each dog or pawl is provided with a small rounded head 19 which projects beyond the face of the wheel and fits into a notch 13 in the master wheel. The other end of the dog or pawl is of great width and is formed in the shape of a flat V so that when the dog or pawl has been moved to a certain position one arm thereof will be projected beyond the face of wheel 14 and when the dog or pawl has been moved in an opposite direction the other arm of the dog or pawl will extend beyond the face of the wheel while the first arm will be flush with the wheel. The inner face of each dog carrying wheel 14 is also provided with lugs 20 which project into openings 12 in wheel 11, said lugs being of less length circumferentially of wheel 11 than the recesses so as to permit limited movement of wheel 11 independently of wheels 14. This limited movement of the wheel 11 will cause the dogs or pawls 17 to move on their pivots by reason of the fact that the heads 19 of the dogs or pawls engage the notches 13 in the wheel 11.

Thus when the transmission means of the automobile are shifted to a position to cause the car to travel in a forward direction the master wheel 11 will be moved in a direction to shift the dogs or pawls to one position and when the parts are set to reverse the movement of the automobile the master wheel will move the dogs or pawls in an opposite direction.

The projecting portions of the dogs or pawls will engage the pins 8 and thus lock the parts of the differential together. If one of the rear wheels travels faster than its companion wheel, as in rounding a corner the pins striking the inclined faces of the projecting arms will be forced inwardly against the action of their springs and thus permit the pin wheel to rotate faster than the pawl carrying wheel.

Preferably, though not necessarily, I provide each pin 8 with a removable wear tip 8' of any preferred or suitable material. These tips prevent wear of the pins and may be readily renewed when required.

Suitable roller bearings, such as shown at 21 are placed between the wheel 6 and the housing 22.

Figure 5:
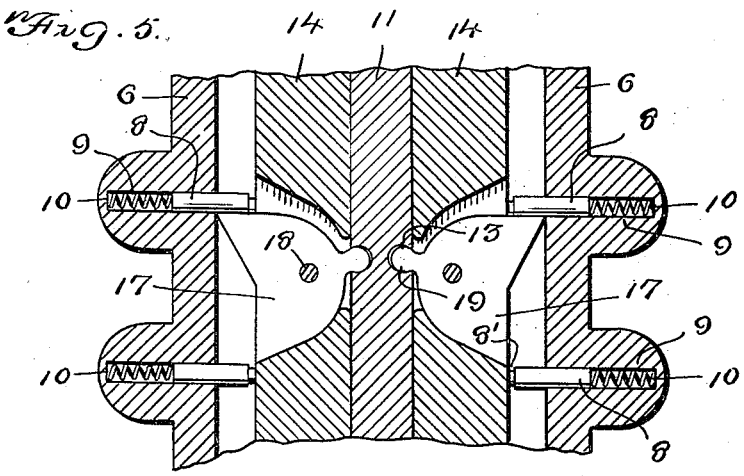
Figures 5 and 6 are views showing the different positions assumed by the parts in the forward and reverse movement of the vehicle.
Figure 6:
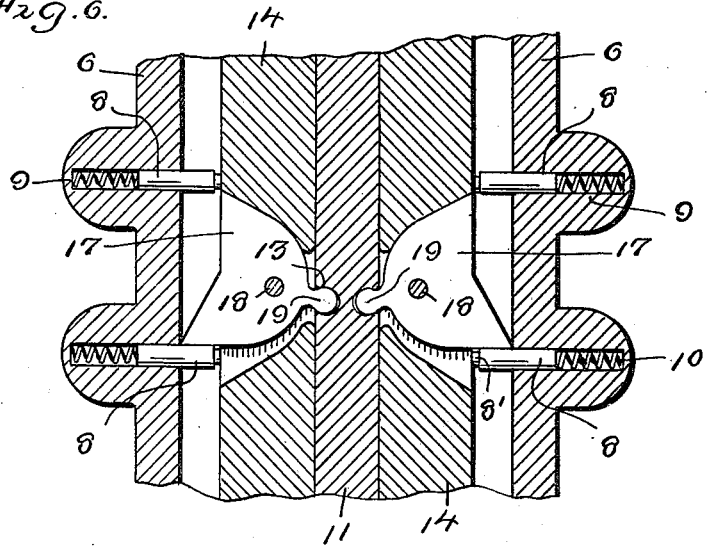
Figure 8:
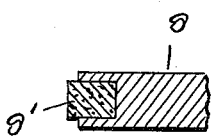

The operation of the differential can be readily understood by referring to Figures 5 and 6 of the drawings. In Figure 5 the parts are shown in the positions they occupy during the normal or forward travel of the automobile. In this figure, master wheel 11 may be considered as being rotated in a clockwise direction as considered from the right hand side of Figure 5. When rotation of wheel 11 is initiated, this wheel will turn independently of the pin carrying wheels 14. This independent movement of wheel 11 rocks pawls 17 on pins 18 so as to project the upper arms of the pawls and retract the lower arms, as considered in Figure 5, the lower arms being flush with the outer faces of wheels 14, as illustrated. Immediately after this adjustment of the pawls occurs, wheel 11 contacts with lugs 20 of wheels 14 causing the latter to rotate with wheel 11. As wheels 14 rotate the projecting arms of pawls 17 contact with pins 8 causing wheels 6 to rotate with wheels 14 and 11 thus rotating shafts or axles 1 and 2 with master wheel 11. When the direction of drive is reversed, pawls 17 are moved into the position illustrated in Figure 6, after which the wheels 14 are rotated with wheel 11 bringing the pawls into contact with pins 8, all of the parts being then rotated with wheel 11 as a unit, in the manner previously described. When it is necessary for one of the wheels 6 to rotate at higher speed than the adjacent wheel 14 as in making a turn, this is permitted by the spring pressed pins 8 which are forced inwardly of wheel 6 into recesses 9, when wheel 6 over runs wheel 14, as will be clear from Figures 5 and 6. This provides simple and efficient means whereby the pawls are set by the limited independent movement of master wheel 11 to drive in either direction, after which the parts of the differential are locked together so that both axles are positively driven at the same speed while either axle may rotate at increased speed as when making a turn.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a jack shaft and rear shafts of a motor vehicle, a master wheel driven by the jack shaft, a pair of dog carrying members arranged adjacent the master wheel, means for connecting the said members with the master wheel so that said wheel will have a certain amount of movement independently of said members, dogs carried by said members and adapted to be moved into reverse and forward positions by the movement of the master wheel, a member secured to the inner ende of each of the rear shafts and spring pressed abutments on each member for engaging the dogs.

2. In combination with a jack shaft and the rear shafts of a motor vehicle, a short shaft located between the inner ends of the rear shafts, a master wheel rotatably mounted on said short shaft and geared to the jack shaft, dog carrying members on the short shaft and arranged one on each side of the master wheel, means for connecting the master wheel with said members so that said master wheel will have limited movement independently of said members, dogs carried by said members and arranged to be moved into their forward and reverse positions by the limited movement of the master wheel, wheels secured to the rear shafts having sockets therein and spring pressed pins in said sockets engaging the dogs.

3. In combination with a jack shaft and the rear shafts of a motor vehicle, a short shaft located between the inner ends of the rear shafts, a master wheel rotatably mounted on the short shaft and geared with the jack shaft, said master wheel having notches and openings in its faces, dog carrying wheels on the short shaft, one on each side of the master wheel, lugs on said dog carrying wheels engaging the openings in the master wheel, said lugs being of less dimensions than the openings to permit limited movement of the master wheel in relation to the dog carrying wheels, dogs carried by said wheels and having projecting portions engaging the notches in the master wheel, a wheel secured to the inner end of each rear shaft having sockets therein and spring pressed pins in said sockets for engaging the dogs.

4. In combination with a jack shaft and the rear shafts of a motor vehicle, a short shaft located between the inner ends of the rear shafts, a master wheel rotatably mounted on the short shaft and geared to the jack shaft, said master wheel having notches and openings in its faces, dog carrying wheels on the short shaft, one on each side of the master wheel, lugs on said dog carrying wheels engaging the openings in the master wheel, said lugs being of less dimensions than the openings to permit limited movement of the master wheel in relation to the dog carrying wheels, dogs carried by said wheels and having projecting portions engaging the notches in the master wheel, a wheel secured to the inner end of each rear shaft having sockets therein and spring pressed pins in said sockets for engaging the dogs, said dogs each having a pair of inclined faces with which the pins are adapted to engage.

5. In combination with a jack shaft and rear shafts of a motor vehicle, a short shaft placed between the ends of the rear shaft, a master wheel pivotally mounted on the short shaft and geared with the jack shaft, said master wheel having openings and notches in its faces, a pair of dog carrying wheels arranged on the short shaft, lugs thereon engaging the openings in the master wheel, said lugs being of less dimensions than the openings, dogs carried by the wheels and having projecting portions engaging the notches in the master wheel, a wheel connected with the inner end of each rear shaft and having sockets therein, spring pressed pins in said sockets for engaging the dogs and wear members carried by the pins for engaging the faces of the dog carrying wheels.

In testimony whereof I affix my signature.

SNOE O. HULETT.